May 8, 1923.
W. V. TURNER
ELECTRIC BATTERY CONTROL DEVICE
Filed Oct. 29, 1917
1,454,526
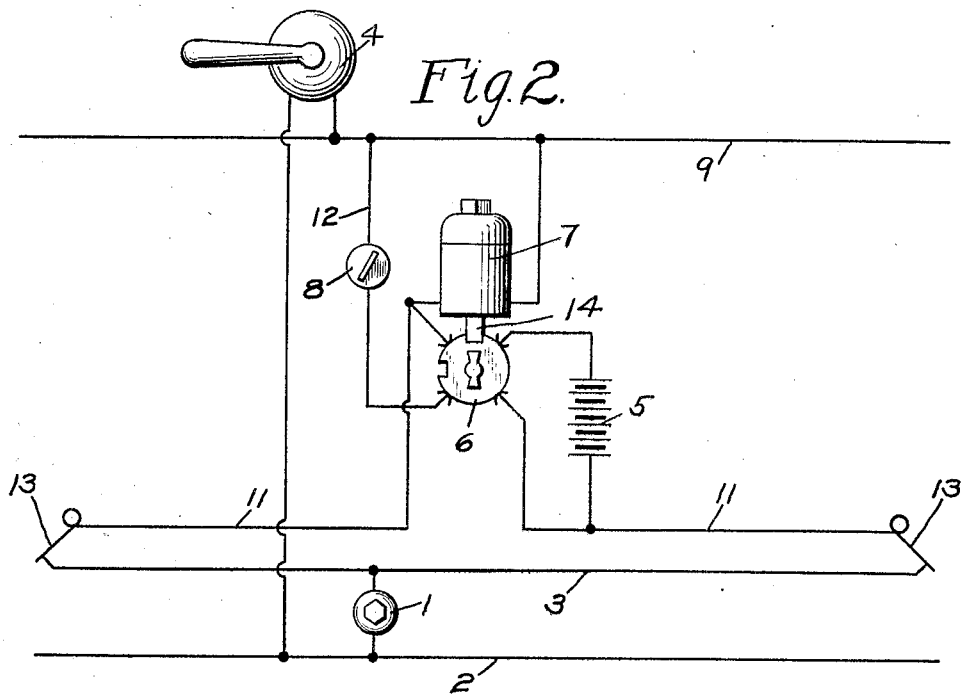
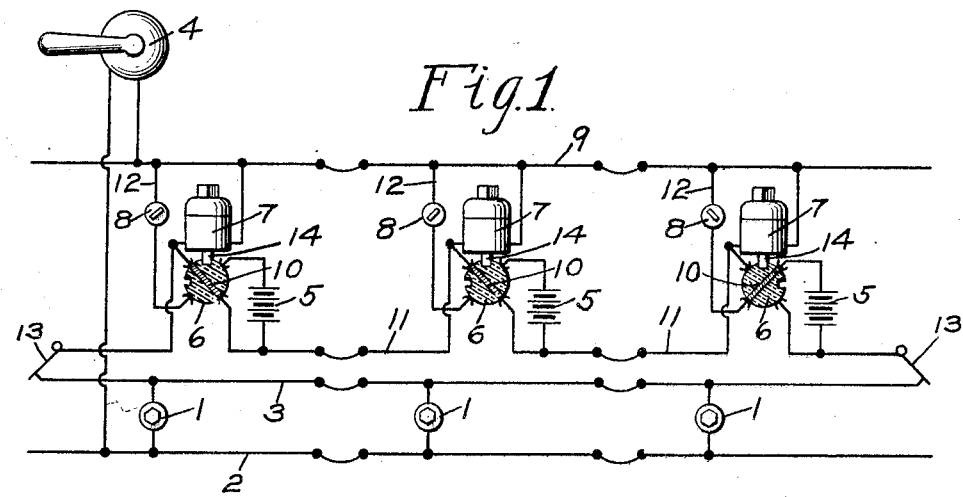
INVENTOR
Walter V. Turner
by Wm. M. Cady
Att'y.

Patented May 8, 1923.

1,454,526

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTRIC-BATTERY-CONTROL DEVICE.

Application filed October 29, 1917. Serial No. 199,008.

*To all whom it may concern:*

Be it known that I, WALTER V. TURNER, a citizen of the United States, residing at Wilkinsburg, in the county of Allegheny and State of Pennsylvania, have invented new and useful Improvements in Electric-Battery-Control Devices, of which the following is a specification.

This invention relates to electric transmission systems, and more particularly to an electric battery control device.

Where a plurality of batteries are adapted to be connected in parallel to a transmission line, each battery is likely to supply a different current, due to differences in the electro-motive force and variations in the internal resistance of the battery.

The electro-motive force of one battery may decrease and the internal resistance increase at a much faster rate than the other batteries, with the result that this battery will rapidly deteriorate and in time not only fail to supply its quota of current, but even draw charging current from the other batteries.

Charging of a battery under the above conditions is inefficient and tends to weaken or destroy the other batteries.

The principal object of my invention is to overcome the above difficulty by providing means operated upon cutting in one battery for preventing the other batteries from being cut in.

In the accompanying drawing, Fig. 1 is a diagrammatic view of an electric system for a train of cars, showing my invention applied thereto, and Fig. 2 a view of the same system as shown in Fig. 1 on an enlarged scale and as applied to a single car.

In order to illustrate one application of my invention, there is shown in the drawing an electric control system as applied to cars for controlling the brakes, in which each car is equipped with one or more magnets 1 for controlling the application and release of the brakes.

The magnets 1 are connected in parallel across an electric supply line 2 and a return line 3, the supply line 2 being connected on the head car to a controlling switch device 4.

On each car there is provided a so called storage battery 5, a switch device 6, a locking magnet 7, adapted to lock the switch 6 in different positions, and a snap switch 8 for connecting the battery to a main transmission line 9.

In one position, the switch device 6 is adapted, through a contact bar 10 to connect an auxiliary return wire 11 with the transmission line 9 by way of a wire 12 containing the snap switch 8, and in another position, the switch device 6 is adapted to complete the return wire circuit on each car, so that there will be a continuous return wire circuit throughout the train.

The locking magnets 7 are each connected in parallel across the return wire 11 and the transmission line 9.

At each end of the car, there is provided a receptacle lid 13 adapted in the closed position to connect the train wire 3 with the return wire 11. Where cars are coupled together, the receptacle lid is lifted and the train wires 3 and 11 are coupled together, so that the receptacle lids only close the circuit across the wires 3 and 11 at opposite ends of the train.

In operation, each switch device 6 is assumed to be set in the position shown on the two left hand cars in Fig. 1 of the drawing, with the snap switch 8 in its open position.

If it is desired to energize the transmission line 9, one of the snap switches 8 is turned to its closed position and the corresponding switch device 6 is turned so that contact bar 10 connects the local storage battery 5, through wire 12 with the transmission line 9, as shown on the car at the extreme right in Fig. 1.

Upon energization of the transmission line the magnet 7 on the intermediate car is then energized through the following circuit; from battery 5, through contact bar 10 of the switch device 6 at the extreme right of the drawing, wire 12 to line wire 9, through magnet 7 of the intermediate car to wire 11, through contact bar 10 of the switch device 6 at the extreme left of the drawing, to wire 11. through jumper 13 at the left, to wire 3, and thence through jumper 13 at the right to battery 5 of the car at the extreme right.

The magnet 7 of the left hand car is energized as follows; from battery 5 of the right hand car through contact bar 10 of the switch device 6 on the right hand car, wire 12 to line wire 9, to magnet 7 on the left hand car, to wire 11, through jumper 13 at the left, to wire 3, and thence through jumper 13 at the right to battery 5.

The magnet 7 of the right hand car is energized as follows; from batery 5 of the right hand car through contact bar 10 of switch device 6 on the right hand car, through wire 12 to line wire 9, through magnet 7 on the right hand car to wire 11, through contact bar 10 on the intermediate car and wire 11, through contact bar 10 on the left hand car to wire 11, and thence through jumper 13 at the left to wire 3, and through jumper 13 at the right to battery 5 of the right hand car.

The energization of each magnet 7 causes the movement of a corresponding locking pin 14, so that same engages in a notch provided in the switch device 6, and thus each switch device 6 is locked in the position it happens to be in at the time the transmission line is energized.

As a consequence, the switch devices on all cars, except the one on which the switch is turned to cut in the corresponding battery, are locked in their cut out positions, while the switch on the car in which the battery is cut in is locked in its cut in position.

Current may now be supplied from the transmission line 9 to the supply line 2 of the braking control system by manipulating the switch 4, the return circuit being completed from the return line 3, through the receptacle lids 13 at the ends of the train, to the auxiliary return wire 11.

In order to shift the line connections from one battery to another, the snap switch 8 on the car having its battery cut in is first turned to open position, so as to cut out the corresponding battery and since the transmission line 9 will now be deenergized, the locking pins 14 will be withdrawn from engagement with the notches in the switch devices 6. The switch device 6 on the cut in car can now be turned to off position, while one of the other switch devices 6, as desired, can be turned to its battery cut in position.

Having now described my invention, what I claim as new and desire to secure by Letters Patent, is:

The combination with an electrically controlled train system having a supply line and a return line, of a transmission line from which current is supplied to the supply line, an auxiliary return wire, a plurality of sources of current, a switch device adapted to connect each source of current across the transmission line and the auxiliary return wire, and having an off position and a magnet device associated with each switch device and operated upon energization of the transmission line by one source of current for locking the other switch devices in off position.

In testimony whereof I have hereunto set my hand.

WALTER V. TURNER.